(No Model.)
W. SCHOTT.
SCALPEL.
No. 488,616. Patented Dec. 27, 1892.
Fig. 1.
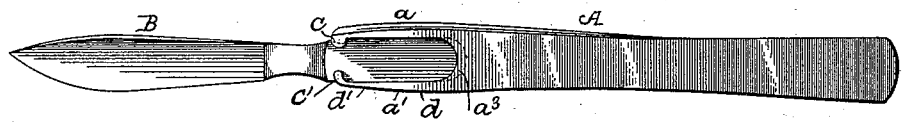
Fig. 2.
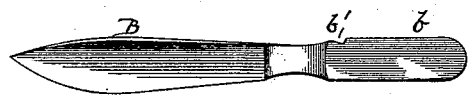
Fig. 4. Fig. 3.
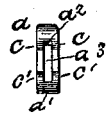 
Witnesses:
John A. Rennie
Benjamin S. Comstock
Inventor:
William Schott
By H. A. West
Attorney.

UNITED STATES PATENT OFFICE.

WILLIAM SCHOTT, OF BROOKLYN, NEW YORK.

SCALPEL.

SPECIFICATION forming part of Letters Patent No. 488,616, dated December 27, 1892.

Application filed February 13, 1892. Serial No. 421,387. (No model.)

*To all whom it may concern:*

Be it known that I, WILLIAM SCHOTT, a citizen of the United States, and a resident of Brooklyn, in the county of Kings and State of New York, have invented certain new and useful Improvements in Detachable Handles and Blades for Surgical and other Instruments, of which the following is a specification.

My invention relates to separate or detachable handles for holding knife blades or other similar instruments which may be attached to and detached from the handle at pleasure, and the object of my invention is to provide a cheap and practical handle which shall be capable of ready use and capable of being easily and thoroughly cleaned.

The invention consists of the construction of the handle and shank of the blade as hereinafter fully described and claimed.

Reference is to be had to the accompanying drawings forming a part of this specification in which similar letters of reference indicate corresponding parts in all of the figures.

Figure 1 is a plan view of my new handle showing a detachable knife blade applied thereto; Fig. 2 is a plan view of the blade detached from the handle; Fig. 3 shows the form of the clasping arms or members of the handle; and Fig. 4 is a front view of the handle.

A represents the handle and B the blade formed with a shank $b$ notched at the back as shown at $b'$. The handle A is formed with a rigid arm $a$ and opposite spring arm $a'$, both integral with the handle. The outer ends of the said arms are formed with small projections $c\ c$ and $c'\ c'$ which embrace the sides of the shank, and the arm $a$ is formed with a lip $a^2$ with which the notch $b'$ of the shank is held to firmly engage by the action of the spring arm $a'$. The projections $c\ c$ and $c'\ c'$ hold the blade against lateral deflection and to assist this action the handle is recessed at $a^3$ or otherwise formed to receive and retain the end of the shank so that all lateral movement or pivoting of the blade is obviated.

To attach the blade to the handle it is only necessary to slip the shank between the arms $a\ a'$ and press it back until the notch $b'$ and lip $a^2$ engage one another, and to detach the blade it is necessary only to press it down against the spring arm $a'$ which will yield at the point and permit the blade to be disengaged from the lip $a^2$, whereupon it may be easily withdrawn from the handle. It will be observed that the arm $a$ is firm and rigid throughout, while arm $a'$ is tapered so that it also is firm and rigid as at $d$ near the handle, only the outer end portion as at $d'$ being flexible. By this form of construction pressure upon the cutting edge of the blade is resisted, not only throughout the back of the shank but also at its front edge at the end so that a perfectly secure and reliable holding of the blade is effected.

While my invention is capable of various applications as to fruit knives, carving knives and forks and cutlery generally, and kindred articles, and tools, it is chiefly designed for surgical use to receive various interchangeable implements, and in addition to its obvious advantages due to simplicity and cheapness of construction and readiness of use, its parts when detached are capable of being thoroughly and easily cleaned.

Having thus described my invention, what I claim as new and desire to secure by Letters Patent is:—

A handle formed at one end with opposite arms to grasp the shank of a detachable instrument, one of said arms being formed with a lip, the other in the form of a spring, in combination with a detachable instrument having a shank to fit between the arms and formed with a notch at the back, substantially as set forth.

WILLIAM SCHOTT.

Witnesses:
F. L. LESTER,
M. BORDEN.